(12) United States Patent
Qi et al.

(10) Patent No.: US 11,531,097 B2
(45) Date of Patent: Dec. 20, 2022

(54) THREE-DIMENSIONAL IMAGING SYSTEM AND METHOD BASED ON ROTATIONAL SCANNING

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Chunchao Qi, Shenzhen (CN); Aixian Wang, Shenzhen (CN); Hanjiang Chen, Shenzhen (CN); Jiaqi Ruan, Shenzhen (CN); Juncheng Liu, Shenzhen (CN); Qian Xiao, Shenzhen (CN); Wei Chen, Shenzhen (CN); Shukai Zhao, Shenzhen (CN)

(73) Assignees: CHINA COMMUNICATION TECHNOLOGY CO., LTD., Guangdong (CN); SHENZHEN INSTITUTE OF TERAHERTZ TECHNOLOGY AND INNOVATION, Guangdong (CN)

( * ) Notice: Subject to any disclaimer, the term of this patent is extended or adjusted under 35 U.S.C. 154(b) by 777 days.

(21) Appl. No.: 16/467,662

(22) PCT Filed: Nov. 16, 2017

(86) PCT No.: PCT/CN2017/111237
§ 371 (c)(1),
(2) Date: Jun. 7, 2019

(87) PCT Pub. No.: WO2018/103519
PCT Pub. Date: Jun. 14, 2018

(65) Prior Publication Data
US 2019/0317208 A1    Oct. 17, 2019

(30) Foreign Application Priority Data

Dec. 9, 2016   (CN) .......................... 201611132424.9

(51) Int. Cl.
*G01S 13/89* (2006.01)
*G01S 13/88* (2006.01)

(52) U.S. Cl.
CPC ............ *G01S 13/887* (2013.01); *G01S 13/89* (2013.01)

(58) Field of Classification Search
CPC ............................. G01S 13/887; G01S 13/89
See application file for complete search history.

(56) References Cited

U.S. PATENT DOCUMENTS 3,718,785 A * 2/1973 Kudritzki ............... H01H 13/18
200/332
5,501,628 A * 3/1996 Simmel .................. A63H 11/18
446/276

(Continued)

FOREIGN PATENT DOCUMENTS

CN       102426361          4/2013
CN       103698762 A   *    4/2014   ........... G01S 13/887

(Continued)

*Primary Examiner* — Matthew M Barker
(74) *Attorney, Agent, or Firm* — FisherBroyles, LLP; Jason P. Mueller

(57) ABSTRACT

A three-dimensional imaging system and method based on rotational scanning is disclosed. The system includes a column-shaped frame with a column-shaped side; a transceiving antenna array element arranged on the column-shaped side that transmits a micro-wave detection signal to a detected object located in the column-shaped frame and receives an echo signal reflected back from the detected object; a signal transceiving device that generates the microwave detection signal and sends same to the transceiving antenna array element and processes the echo signal; a (Continued)

rotation control device that controls rotational movement of the transceiving antenna array element so that the transceiving antenna array element transmits the micro-wave detection signal to the detected object in a plurality of angles; and a positioning trigger fixedly arranged on the column-shaped frame and configured to trigger the signal transceiving device when the transceiving antenna array element arrives at a position of the positioning trigger.

14 Claims, 4 Drawing Sheets

(56) References Cited

U.S. PATENT DOCUMENTS

| 2004/0140924 | A1* | 7/2004 | Keller | G01N 21/3563 |
| | | | | 342/179 |
| 2018/0321373 | A1* | 11/2018 | Qi | G01S 7/03 |
| 2019/0243022 | A1* | 8/2019 | Qi | G01S 13/90 |

FOREIGN PATENT DOCUMENTS

| CN | 204228978 | 3/2015 |
| CN | 105759269 A | 7/2016 |
| CN | 105938206 A | 9/2016 |
| CN | 106094734 A | 11/2016 |
| CN | 106680814 A | 5/2017 |
| CN | 206339649 U | 7/2017 |
| WO | 2008054865 A2 | 5/2008 |

* cited by examiner

ENGLISH TRANSLATION OF INTERNATIONAL PUBLICATION

THREE-DIMENSIONAL IMAGING SYSTEM AND METHOD BASED ON ROTATIONAL SCANNING

CROSS-REFERENCE TO RELATED APPLICATIONS

This application is a national stage entry under 35 U.S.C. of 371 of PCT Patent Application No. PCT/CN2017/111237, filed Nov. 16, 2017, which claims priority to Chinese Patent Application No. 201611132424.9, filed Dec. 9, 2016, the entire contents of each of which is incorporated herein by reference.

BACKGROUND

Technical Field

This disclosure relates to the field of scanning imaging, and in particular to a three-dimensional imaging system and method based on rotational scanning.

Description of Related Art

Compared with imaging technologies based on visible light, infrared light, X rays and the like, a three-dimensional imaging technology based on micro-wave imaging has many unique advantages and thus has become an important development trend of a close-range three-dimensional imaging technology. At present, an antenna array element is driven to mechanically move to realize omni-directional scanning on a detected object in the field of micro-wave three-dimensional imaging.

As the antenna array element has a nonuniform velocity in the process of mechanical movement, scanning detection is started generally when the antenna array element is controlled in a timing manner to move to a corresponding scanning spot. However, due to equipment aging and other factors, the antenna array element cannot accurately move to the scanning spot to transmit and receive a micro-wave signal, which probably causes unclear three-dimensional imaging and influences detection effects.

BRIEF SUMMARY

Based on the embodiments of this application, a three-dimensional imaging system and method based on rotational scanning are provided to realize clear imaging and good detection effects.

A three-dimensional imaging system based on rotational scanning includes:

a column-shaped frame, wherein a column-shaped side is formed on the column-shaped frame;

a transceiving antenna array element, which is arranged on the column-shaped side and is configured to transmit a micro-wave detection signal to a detected object located in the column-shaped frame and receive an echo signal reflected back from the detected object;

a signal transceiving device, which is connected to the transceiving antenna array element and is configured to generate the micro-wave detection signal and send same to the transceiving antenna array element and process the echo signal;

a rotation control device, which is connected to the transceiving antenna array element and is configured to control rotational movement of the transceiving antenna array element along the column-shaped side so that the transceiving antenna array element transmits the micro-wave detection signal to the detected object in a plurality of angles; and a positioning trigger, which is connected to the transceiving antenna array element, wherein the positioning trigger is fixedly arranged on the column-shaped frame and is configured to trigger the signal transceiving device when the transceiving antenna array element arrives at a position of the positioning trigger.

A three-dimensional imaging method based on rotational scanning includes the following stages:

receiving an initial signal, and controlling a transceiving antenna array element to rotationally scan a detected object in a plurality of angles according to the initial signal;

controlling the transceiving antenna array element to rotationally scan to a corresponding position to trigger a positioning trigger to generate a trigger signal;

generating a micro-wave detection signal according to the trigger signal, and transmitting the micro-wave detection signal to the detected object through the transceiving antenna array element; and processing an echo signal reflected back from the detected object and received by the transceiving antenna array element.

The details of one or more embodiments of the disclosure are given in the following drawings and descriptions. Other characteristics, purposes and advantages of the disclosure will become obvious in the specification, the drawings and the claims.

BRIEF DESCRIPTION OF THE DRAWINGS

The accompanying drawings are part of the disclosure and are incorporated into the present specification. The drawings illustrate examples of embodiments of the disclosure and, in conjunction with the description and claims, serve to explain, at least in part, various principles, features, or aspects of the disclosure. Certain embodiments of the disclosure are described more fully below with reference to the accompanying drawings.

DETAILED DESCRIPTION

The following description illustrates various embodiments. However, various aspects of the disclosure may be implemented in many different forms and should not be construed as being limited to the implementations set forth herein. Like numbers refer to like, but not necessarily the same or identical, elements throughout.

Figure 1:
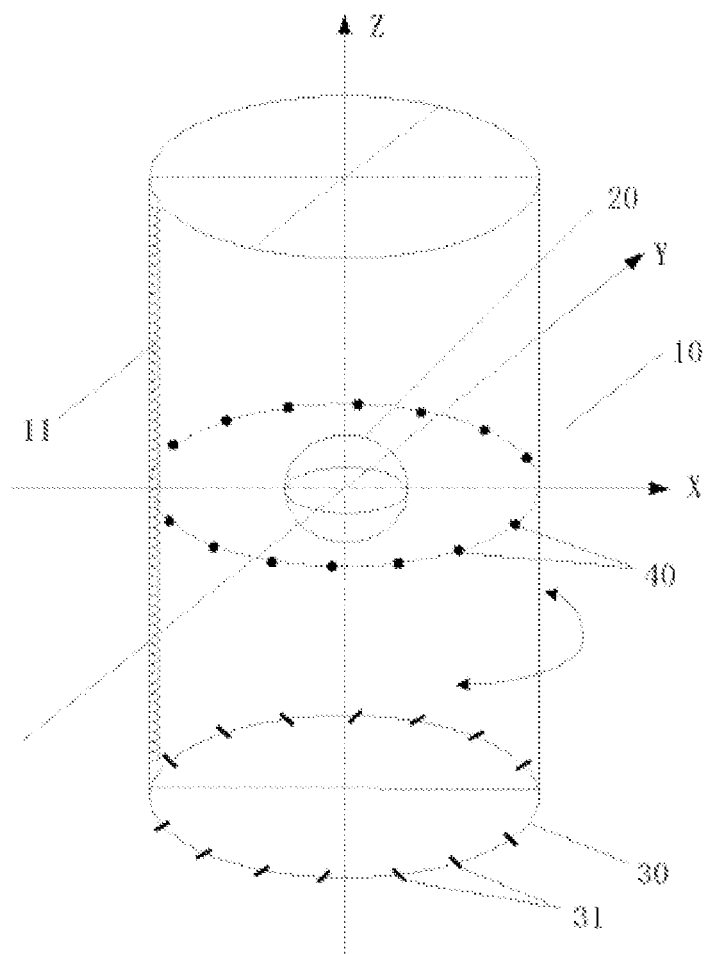
FIG. 1 is a structural view of a three-dimensional imaging system based on rotational scanning according to one embodiment.
Figure 2:
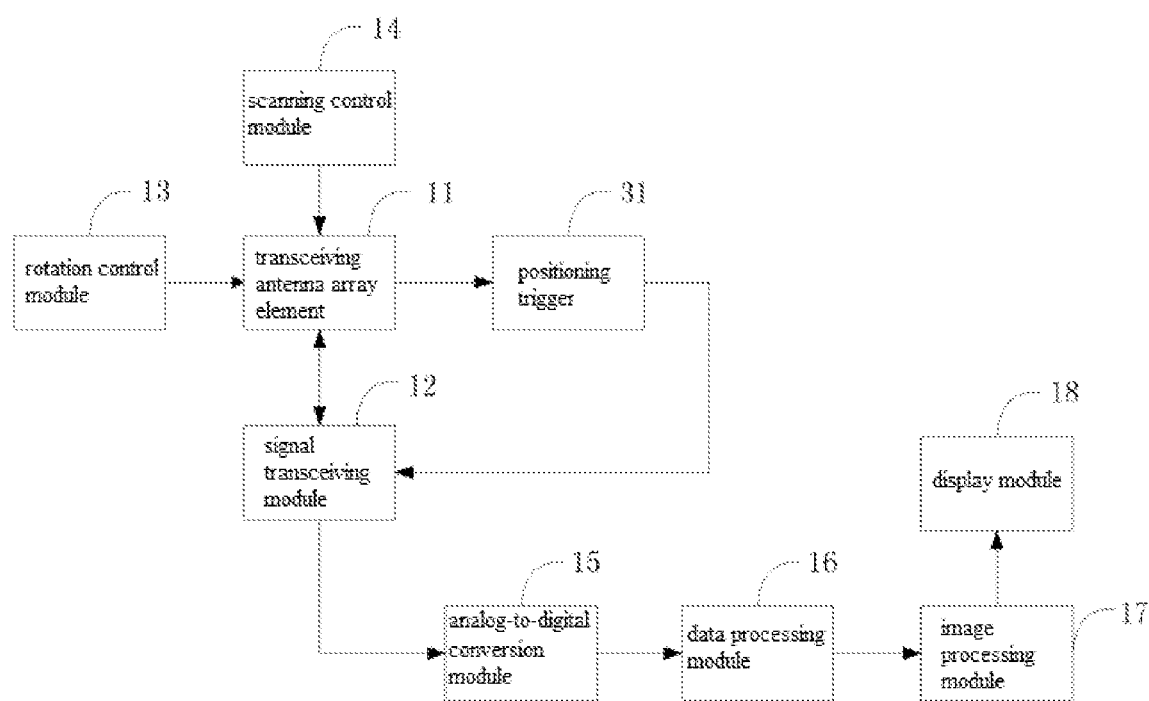
FIG. 2 is a structural block diagram of the three-dimensional imaging system based on rotational scanning according to one embodiment.

Referring to FIG. 1 and FIG. 2, wherein FIG. 1 is a structural view of a three-dimensional imaging system based on rotational scanning according to one embodiment, and FIG. 2 is a structural block diagram of the three-dimensional imaging system based on rotational scanning according to one embodiment.

In this embodiment, the three-dimensional imaging system based on rotational scanning includes a column-shaped frame 10, a transceiving antenna array element 11, a signal transceiving device 12, a rotation control device 13 and positioning triggers 31.

The column-shaped frame 10 includes a column-shaped side and is in a hollow structure. The column-shaped frame 10 can be a cylindrical frame.

The transceiving antenna array element 11 is arranged on the column-shaped side and transmits a micro-wave detection signal to a detected object 20 located in the column-shaped frame 10 and receiving an echo signal reflected back from the detected object 20.

Antenna devices of the transceiving antenna array element 11 are longitudinally distributed on the side of the column-shaped frame 10. The transceiving antenna array element 11 may be a linear transceiving antenna array for realizing one-dimensional scanning on the detected object 20 or a plane transceiving antenna array for realizing two-dimensional scanning on the detected object 20. The transceiving antenna array element 11 includes a transmitting antenna array element and a receiving antenna array element, which are arranged in parallel so as to facilitate signal's transceiving and guarantee signal transceiving quality.

The signal transceiving device 12 transmits the micro-wave detection signal to the transceiving antenna array element 11 and processing the echo signal.

The signal transceiving device 12 generates a micro-wave detection signal and then sends same to the transmitting antenna array element. The transmitting antenna array element transmits the micro-wave detection signal to the detected object 20 to scans it. Micro-wave detection signal reflected by the detected object 20 forms an echo signal, which is received by the transmitting antenna array element and sent to the signal transceiving device 12 to process, As a result, the image information of the detected object 20 is obtained.

The rotation control device 13 controls the rotational movement of the transceiving antenna array element 11 along the column-shaped side so that the transceiving antenna array element 11 transmits the micro-wave detection signal to the detected object 20 in a plurality of angles.

Under the control and driving action of the rotation control device 13, the transceiving antenna array element 11 rotationally moves along the side of the column-shaped frame 10, transmitting the millimeter-wave detection signal to the detected object 20 located in the column-shaped frame 10 from a 360° angle and receiving the echo signal reflected back from the detected object 20, so as to realize a three-dimensional scanning on the detected object 20.

The rotation control device 13 is able to adjust the movement velocity of the transceiving antenna array element 11, and the imaging velocity can be increased by increasing the movement velocity of the transceiving antenna array element 11 under the condition that the definition of the scanning imaging is guaranteed, so that the detected object 20 can be detected at a higher speed.

The positioning trigger 31 is fixedly arranged on the column-shaped frame 10 and is configured to trigger the signal transceiving device 12 when the transceiving antenna array element 11 arrives at a position of the positioning trigger 31.

A circular guide rail 30 is fixedly arranged at the lower edge of the column-shaped frame 10. The circular guide rail 30 can also be arranged on the column-shaped side, other positions parallel to the lower edge. A plurality of positioning triggers 31 are arranged on the circular guide rail 30, and the transceiving antenna array element 11 is controlled by the rotation control device 13 to rotationally move along the circular guide rail 30.

When the transceiving antenna array element 11 arrives at a position of one of the positioning triggers 31, the signal transceiving device 12 is automatically triggered to transmit the micro-wave detection signal to the transceiving antenna array element 11, which then scans the detected object 20. Scanning is triggered at fixed points through the positioning triggers 31, and the transceiving antenna array element 11 can transmit the micro-wave detection signal on one preset scanning spot 40. The scanning spots 40 are accurately positioned so as to guarantee the scanning quality, so that a clear image of the detected object 20 is formed, and the detection effect is good.

One positioning trigger 31 corresponds to one scanning spot 40, and the transceiving antenna array element 11 scans the detected object 20 at the positions of the positioning triggers 31, namely the positions of the scanning spots 40.

In one embodiment, the positioning trigger 31 is a pressure sensors or an optical sensor.

In one embodiment, the three-dimensional imaging system based on rotational scanning also includes a scanning control device 14 that controls the transceiving antenna array element 11 to scan the detected object 20.

The antenna devices in the transceiving antenna array element 11 are successively started by the scanning control device 14 in a preset timing sequence to successively transmit the micro-wave detection signal and successively receive the echo signal so as to realize the scanning of the detected object 20 at a current angle, namely the scanning of the transceiving antenna array element 11 on the current scanning spot 40. The scanning angle of the transceiving antenna array element 11, namely the position of the corresponding scanning spot 40 of the transceiving antenna array element 11, is changed under the driving of the rotation control device 13, so that three-dimensional scanning imaging of the detected object 20 is realized.

In one embodiment, the three-dimensional imaging system based on rotational scanning also includes an analog-to-digital conversion device 15 and a data processing device 16, wherein the analog-to-digital conversion device 15 is connected to the signal transceiving device 12 and converts the echo signal into a digital signal, and the data processing device 16 is connected to the analog-to-digital conversion device 15 and converts the digital signal into image data of the detected object 20.

The data processing device 16 sets the frequency range and the frequency interval of the micro-wave detection signal to improve the imaging quality.

In one embodiment, the three-dimensional imaging system based on rotational scanning also includes an image processing device 17, which is connected to the data processing device 16 and is configured to generate a three-dimensional image of the detected object 20 according to the image data.

In one embodiment, the three-dimensional imaging system based on rotational scanning also includes a display device 18, which is connected to the image processing device 17 and is configured to display the three-dimensional image.

The image of the detected object 20 obtained by scanning is displayed to be checked by an inspector, so that the detected object 20 is detected.

According to the three-dimensional imaging system based on rotational scanning, the circular guide rail 30 is arranged on the column-shaped frame 10, and a plurality of positioning triggers 31 are arranged on the circular guide rail 30; when the transceiving antenna array element 11 arrives at a position of one of the positioning triggers 31, the signal transceiving device 12 is automatically triggered to transmit the micro-wave detection signal to the transceiving antenna array element 11, which then scans the detected object 20 at a current angle under the control of the scanning control device 14, The rotation control device 13 controls the rotation movement of the transceiving antenna array element 11 along the circular guide rail 30 so as to realize three-dimensional scanning on the detected object 20. The three-dimensional imaging system based on rotational scanning has accurately-positioned scanning spots, a high scanning speed, clear imaging and a good detection effect. This system not only can be used for security detection in public places, such as airport, sea port and station, but also can be used for contraband inspection, border inspection, cutting garments to fit the body, manufacture of security equipment, and other important occasions.

Figure 3:
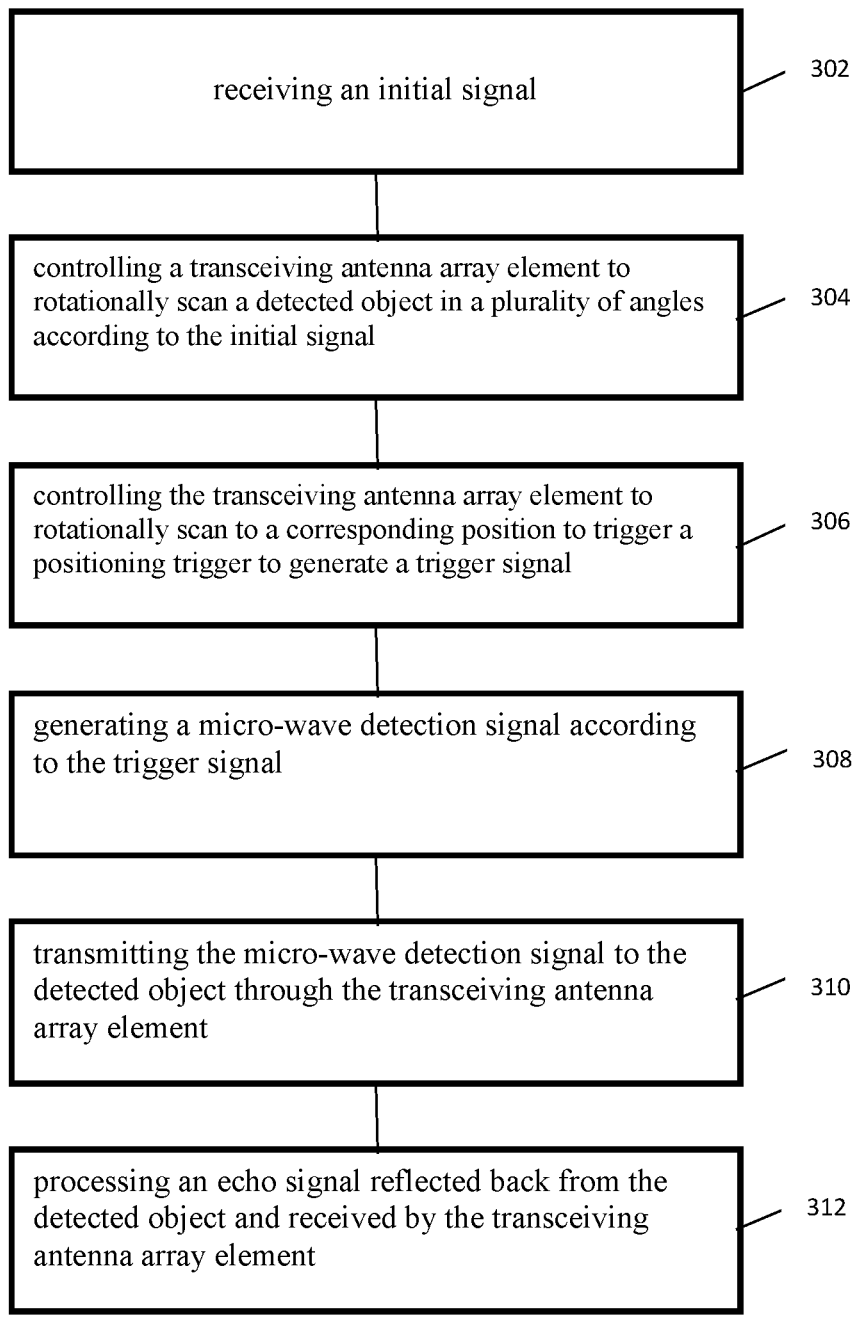
FIG. 3 is a flow chart of a three-dimensional imaging method based on rotational scanning according to one embodiment.
Figure 4:
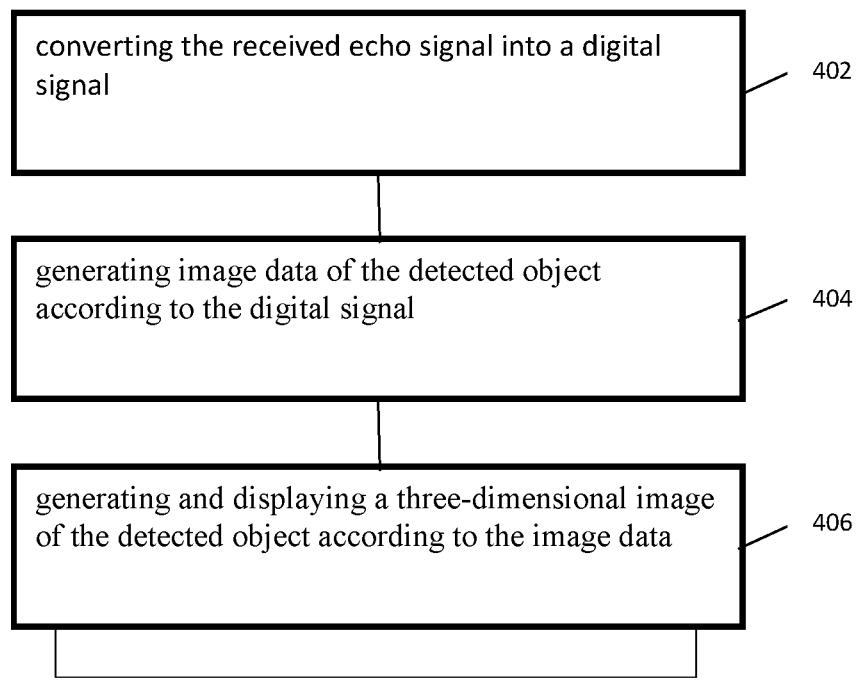
FIG. 4 is a flow chart of the three-dimensional imaging method based on rotational scanning according to another embodiment.

FIG. 3 illustrates a three-dimensional imaging method based on rotational scanning. The method includes the following stages:

Stage 302: receiving an initial signal; stage 304: controlling a transceiving antenna array element to rotationally scan a detected object in a plurality of angles according to the initial signal;

A rotation control device receives the initial signal and controls the transceiving antenna array element to rotationally scan the detected object in a plurality of angles according to the initial signal. The transceiving antenna array element is arranged on the column-shaped side of a column-shaped frame and can transmit a micro-wave detection signal to the detected object located in the column-shaped frame and receive an echo signal reflected back from the detected object. The column-shaped frame is in a hollow structure and can be a cylindrical frame. Antenna devices of the transceiving antenna array element are longitudinally distributed on the side of the column-shaped frame. The transceiving antenna array element is a linear transceiving antenna array for realizing one-dimensional scanning on the detected object or a plane transceiving antenna array for realizing or two-dimensional scanning on the detected object. The transceiving antenna array element includes a transmitting antenna array element and a receiving antenna array element, which are arranged in parallel so as to facilitate signal's transceiving and guarantee the signal transceiving quality.

Stage 306: controlling the transceiving antenna array element to rotationally scan to a corresponding position to trigger the corresponding positioning trigger to generate a trigger signal.

The rotation control device controls the rotational scanning movement of the transceiving antenna array element along the side of the column-shaped frame, wherein a plurality of positioning triggers are arranged on a circular guide rail, and the transceiving antenna array element is controlled by the rotation control device to rotationally move along the circular guide rail. When the transceiving antenna array element arrives at a position of one of the positioning triggers, the signal transceiving device is automatically triggered to generate the trigger signal. One positioning trigger corresponds to one scanning spot. The transceiving antenna array element scans the detected object at the positions of the positioning triggers, namely the positions of the scanning spots.

Specifically, the movement velocity of the transceiving antenna array element can be adjusted through the rotation control device, and the imaging velocity can be increased by increasing the movement velocity of the transceiving antenna array element under the condition that the definition of the scanning imaging is guaranteed, so that the detected object can be detected at a higher speed;

Stage 308: generating a micro-wave detection signal according to the trigger signal.

The signal transceiving device receives the trigger signal, generates a micro-wave detection signal according to the trigger signal and sends the micro-wave detection signal to the transceiving antenna array element.

310: transmitting the micro-wave detection signal to the detected object through the transceiving antenna array element.

The signal transceiving device receives a trigger signal, generates a micro-wave detection signal according to the trigger signal and sends the micro-wave detection signal to the transceiving antenna array element. The transceiving antenna array element transmits the micro-wave detection signal to the detected object to scan the detected object. Scanning is triggered at fixed points through the positioning triggers, and the transceiving antenna array element can transmit the micro-wave detection signal on one preset scanning spot. The scanning spots are accurately positioned so as to guarantee the scanning quality, so that a clear image of the detected object is formed, and the detection effect is good.

Stage 312: processing the echo signal reflected back from the detected object and received by the transceiving antenna array element.

The echo signal reflected back from the detected object is received, data analysis processing is performed on the received echo signal, so as to realize three-dimensional scanning on the detected object.

In one embodiment, this method also includes the following stages: starting antenna devices in the transceiving antenna array element successively according to a preset timing sequence to successively transmit the micro-wave detection signal and successively receive the echo signal so as to realize the scanning of the detected object at a current angle, namely the scanning of the transceiving antenna array element on the current scanning spot. The scanning angle of the transceiving antenna array element, namely the position of the corresponding scanning spot of the transceiving antenna array element, is changed under the driving of the rotation control device, so that three-dimensional scanning imaging on the detected object is realized.

In one embodiment, after the echo signal reflected back from the detected object and received by the transceiving antenna array element is processed, the three-dimensional imaging method based on rotational scanning also includes the following stages:

402: converting the received echo signal into a digital signal.

An analog-to-digital conversion device converts the echo signal into a digital signal.

404: generating image data of the detected object according to the digital signal.

A data processing device is connected to the analog-to-digital conversion device and converts the digital signal into the image data of the detected object.

406: generating and displaying the three-dimensional image of the detected object according to the image data; and An image processing device is connected to the data processing device and generates the three-dimensional image of the detected object according to the image data. A display device is connected to the image processing device and is configured to display the three-dimensional image. The image of the detected object obtained by scanning is displayed to be checked by an inspector, so that the detected object is detected.

According to the three-dimensional imaging method based on rotational scanning, an initial signal is received, and the transceiving antenna array element is controlled to rotationally scan the detected object in a plurality of angles according to the initial signal; the transceiving antenna array element is controlled to rotationally scan to the corresponding position to trigger the corresponding positioning trigger to generate a trigger signal; a micro-wave detection signal is generated according to the trigger signal and is transmitted to the detected object thought the transceiving antenna array element; and an echo signal reflected back from the detected object and received by the transceiving antenna array element is processed. The three-dimensional imaging method based on rotational scanning has accurately-positioned scanning spots, a high scanning speed, clear imaging and a good detection effect.

The technical characteristics of the above embodiments can be arbitrarily combined, and for simplicity, not all possible combinations of the technical characteristics of the above embodiments are described; however, as long as not contradictory, the combinations of these technical characteristics should also fall within the scope recited in this specification.

The above embodiments only express several implementations of the disclosure and are specifically described in detail, but should not be construed as a limit to the scope of the disclosure. It should be noted that those ordinarily skilled in this field are permitted to make several deformations and improvements without departing from the conception of the disclosure, all of which should also fall within the protection scope of the disclosure. Thus, the protection scope of the patent of disclosure should be subject to the appended claims.

What is claimed is:

1. A three-dimensional imaging system based on rotational scanning, comprising:
    a column-shaped frame, comprising a column-shaped side, wherein, the column-shaped frame is provided with a circular guide rail arranged along a rotational direction;
    a transceiving antenna array element, arranged on the column-shaped side and configured to transmit a micro-wave detection signal to a detected object located in the column-shaped frame and to receive an echo signal reflected back from the detected object;
    a signal transceiving module, connected to the transceiving antenna array element and configured to generate the micro-wave detection signal and send the micro-wave detection signal to the transceiving antenna array element and to process the echo signal;
    a rotation control module, connected to the transceiving antenna array element and configured to control rotational movement of the transceiving antenna array element along the column-shaped side so that the transceiving antenna array element transmits the micro-wave detection signal to the detected object in a plurality of angles; and
    a plurality of positioning triggers, connected to the signal transceiving module, wherein the plurality of positioning triggers are fixedly arranged on the circular guide rail corresponding to a plurality of preset scanning spots respectively and are configured to trigger the signal transceiving module when the transceiving antenna array element arrives at a position of each of the plurality of positioning triggers to detect object at fixed points at positions of the plurality of preset scanning spots.

2. The system according to claim 1, comprising two or more positioning triggers.

3. The system according to claim 1, wherein the positioning trigger is a pressure sensor or an optical sensor.

4. The system according to claim 1, wherein the column-shaped frame is a cylindrical frame.

5. The system according to claim 1, wherein the transceiving antenna array element is controlled by the rotation control module to rotationally move along the circular guide rail.

6. The system according to claim 5, wherein the positioning trigger is fixedly arranged on the circular guide rail.

7. The system according to claim 1, wherein the transceiving antenna array element comprises a plurality of antenna units arranged on the column-shaped side in a generatrix direction of the column-shaped frame.

8. The system according to claim 7, further comprising a scanning control module, configured to successively control the antenna units in the transceiving antenna array element to scan the detected object in a preset timing sequence.

9. The system according to claim 1, wherein the transceiving antenna array element is a linear transceiving antenna array or a plane transceiving antenna array.

10. The system according to claim 1, further comprising an analog-to-digital conversion module and a data processing module, wherein the analog-to-digital conversion module is connected to the signal transceiving module and converts the echo signal into a digital signal, and the data processing module is connected to the analog-to-digital conversion module and converts the digital signal into image data of the detected object.

11. The system according to claim 10, further comprising an image processing module connected to the data processing module and configured to generate a three-dimensional image of the detected object according to the image data.

12. The system according to claim 11, further comprising a display module connected to the image processing module and configured to display the three-dimensional image.

13. A three-dimensional imaging method based on rotational scanning, comprising:
    receiving an initial signal;
    controlling a transceiving antenna array element to rotationally scan a detected object in a plurality of angles according to the initial signal;
    controlling the transceiving antenna array element to rotationally move along a circular guide rail, wherein, when the transceiving antenna array element arrives at a position of each of a plurality of positioning triggers corresponding to a plurality of preset scanning spots respectively, a trigger signal is generated to scan at fixed points at positions of the plurality of preset scanning spots;
    generating a micro-wave detection signal according to the trigger signal;
    transmitting the micro-wave detection signal to the detected object through the transceiving antenna array element; and processing an echo signal reflected back from the detected object and received by the transceiving antenna array element.

14. The method according to claim 13, further comprising:
converting the received echo signal into a digital signal;
generating image data of the detected object according to the digital signal; and
generating and displaying a three-dimensional image of the detected object according to the image data.

* * * * *